(12) United States Patent
Nijim et al.

(10) Patent No.: US 9,736,541 B1
(45) Date of Patent: Aug. 15, 2017

(54) PAIRING A SET-TOP BOX AND PERSONAL COMPUTING DEVICE USING A VISUAL CODE

(71) Applicant: Cox Communications, Inc., Atlanta, GA (US)

(72) Inventors: Yousef Wasef Nijim, Roswell, GA (US); Jay Paul Langa, Cumming, GA (US); James Alan Strothmann, Johns Creek, GA (US); Eric S. Roberts, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 224 days.

(21) Appl. No.: 13/787,393

(22) Filed: Mar. 6, 2013

(51) Int. Cl.
*H04N 21/435* (2011.01)
*H04N 21/4425* (2011.01)
*H04N 21/475* (2011.01)

(52) U.S. Cl.
CPC ................. *H04N 21/4751* (2013.01)

(58) Field of Classification Search
CPC ............... H04W 76/02; H04W 76/025; H04N 21/4751; H04N 21/435; H04N 21/4425; H04N 2005/4425; H04M 1/72533
USPC ......................................................... 725/30
See application file for complete search history.

(56) References Cited

U.S. PATENT DOCUMENTS

| | | | | |
|---|---|---|---|---|
| 8,863,185 B2* | 10/2014 | Stinson, III | ........ | H04N 5/44543 725/37 |
| 9,591,680 B2* | 3/2017 | Kim | .................... | H04W 76/023 |
| 2007/0271387 A1* | 11/2007 | Lydon | .................. | G06F 1/3209 709/230 |
| 2009/0239587 A1* | 9/2009 | Negron | ............... | G06F 3/04883 455/566 |
| 2009/0268754 A1* | 10/2009 | Palm | .................... | H04L 67/2823 370/466 |
| 2010/0040029 A1* | 2/2010 | Doppler | ................ | H04W 28/18 370/338 |
| 2010/0154018 A1* | 6/2010 | Cho | ...................... | H04N 21/235 725/111 |
| 2010/0330979 A1* | 12/2010 | Harris | ..................... | H04L 63/08 455/420 |
| 2011/0010734 A1* | 1/2011 | Newell | .............. | H04N 21/4181 725/31 |
| 2011/0273625 A1* | 11/2011 | McMahon | ............ | G06F 21/445 348/734 |
| 2012/0086563 A1* | 4/2012 | Arling | ................... | G06F 3/0486 340/12.52 |
| 2012/0223132 A1* | 9/2012 | Lim | .................... | H04M 1/2755 235/375 |
| 2012/0266200 A1* | 10/2012 | Dasher et al. | .................. | 725/93 |

(Continued)

OTHER PUBLICATIONS

Warren, Christina, Comcast Turns Your iPad Into a Remote Control and TV Guide, Nov. 15, 2010, http://mashable.com/2010/11/15/xfinity-tv-ipad/, 16 pgs.

*Primary Examiner* — Nathan Flynn
*Assistant Examiner* — Tung T Trinh
(74) *Attorney, Agent, or Firm* — Merchant & Gould

(57) ABSTRACT

Embodiments are configured in part to pair or associate a portable or personal computing device with a set-top box (STB) to enable use of the paired device with an associated STB. Processing of a displayed visual code can be used to establish a pairing relationship and allow a paired STB to process navigation, control, and/or other commands from a paired device.

20 Claims, 7 Drawing Sheets

(56) References Cited

U.S. PATENT DOCUMENTS

2012/0317489 A1* 12/2012 Kuulusa .............. G06F 3/04883
                                                          715/733
2012/0324076 A1* 12/2012 Zerr ..................... H04W 4/206
                                                          709/223
2013/0175333 A1*  7/2013 Gilbert ............. H04N 21/41407
                                                          235/375

* cited by examiner

PAIRING A SET-TOP BOX AND PERSONAL COMPUTING DEVICE USING A VISUAL CODE

BACKGROUND

Currently, cable and satellite television providers offer a variety of services for consumers to choose from for both home and business users. Depending on the services offered, users may be able to subscribe to receive cable services, satellite, cellular, and/or other services. Typically, a consumer will be required to use a set-top box (STB) or other decrypting device and/or a modem in order to receive a full array of services.

With the ready availability and preference of using portable devices, users tend to rely more and more on such devices for many types of computing and communicating activities. Some service providers offer mobile applications that can be used with smartphones, tablet computers, or laptop computers to access some defined portion of subscribed to cable television services. However, there is no current solution as to how to associate a user's portable device with a STB to efficiently manage device to STB pairing relationships.

SUMMARY

To overcome the limitations described above, and to overcome other limitations that will become apparent upon reading and understanding the present specification.

Embodiments are configured in part to pair or associate a portable or personal computing device with a set-top box (STB) to enable use of the paired device with an associated STB. A method of an embodiment operates to pair a personal or mobile device with a STB based in part on processing of a displayed visual code to establish a pairing relationship and allow the paired STB to process navigation, control, and/or other commands from the paired device. Computer storage of an embodiment includes instructions or code operable to process a visual pairing code to establish a pairing relationship between a STB and companion user device. Other embodiments are included.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Figure 1:
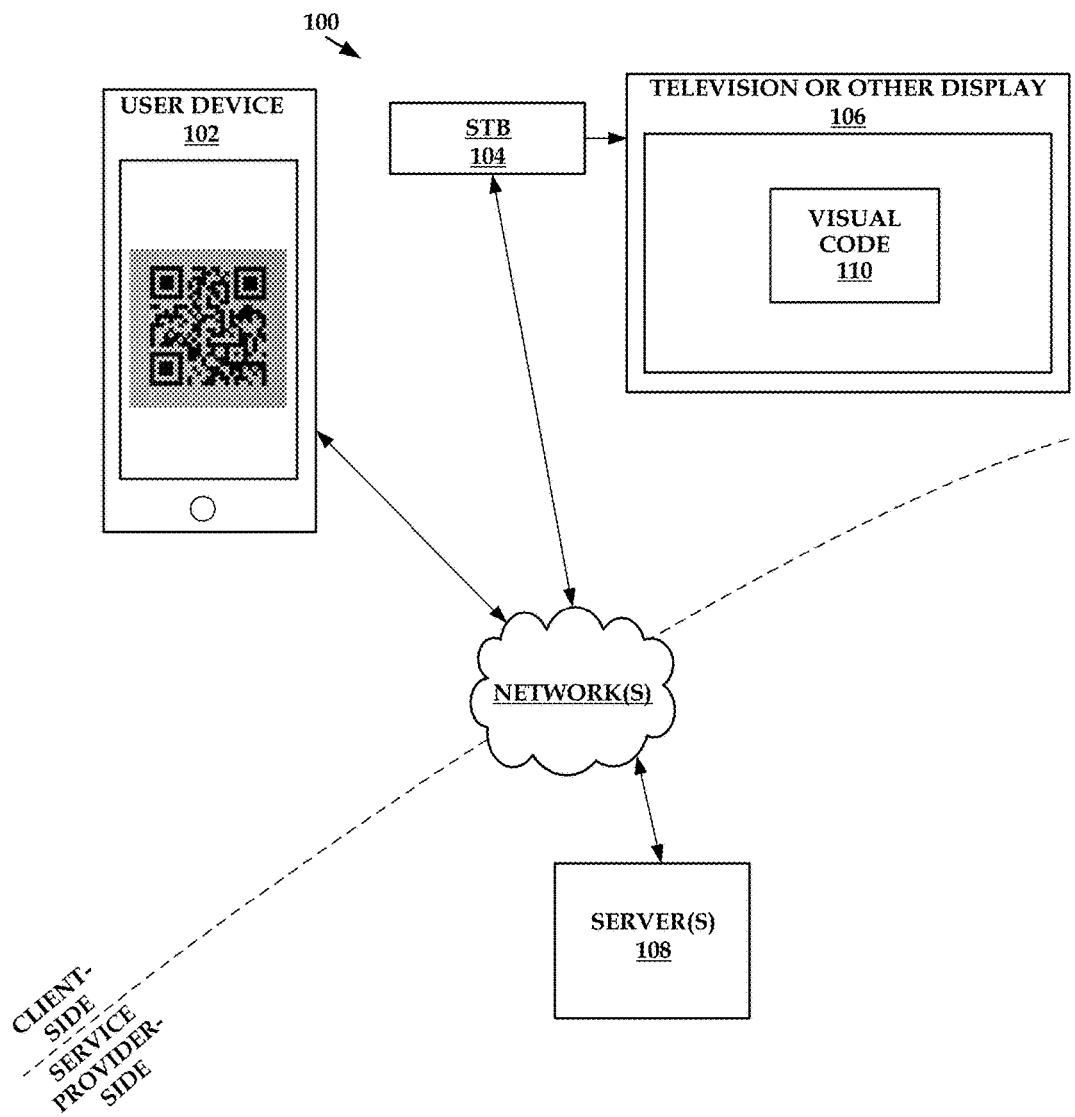
FIG. 1 is a simplified block diagram depicting aspects of an exemplary communication architecture according to an embodiment.

FIG. 1 is a simplified block diagram depicting aspects of an exemplary communication architecture 100 according to an embodiment. As shown in FIG. 1, the exemplary communication architecture 100 includes a portable/mobile or personal device 102, a set-top box (STB) 104 coupled to a television or other display 106, and a server 108, but is not so limited. The components depicted in FIG. 1 are not to scale. It will be appreciated that while a limited number of components are depicted in FIG. 1, a complex communication network used to deliver television programming and other network services includes many types of operational components, including hardware and software components.

The personal device 102 can be paired with STB 104 to establish a device-STB pairing relationship such that commands issued from the personal device 102 can be acted upon by the STB 104. As described below, a pairing method can be used to establish a communicative device-STB pairing relationship between personal device 102 and STB 104, such that a user can use the personal device 102 to interact with and/or control the STB 104 while receiving personalized content for viewing on the personal device 102 or television display 106.

According to an embodiment, a user can pair the personal device 102 (e.g., smartphone, tablet device, laptop, etc.) with STB 104 or some other STB, and once paired, use the personal device 102 to interact with and control the STB 104. The personal device 102 of an embodiment is configured to process a displayed visual code 110 provided by or via a corresponding STB as part of establishing a device-STB pairing relationship. An example depiction of the visual code 110 is shown on the screen or display of the personal device 102 in FIG. 1.

Once a device-STB pairing relationship is established, device messages and/or commands can be received by a networked component (e.g., server 108) and/or directly by the paired STB 104. For example, once the device-STB pairing relationship is established after decoding the visual code 110, a user can use the familiar interface and controls provided by a paired smartphone or tablet computer to interact with STB 104 and also receive personalized content via the STB 104 including personalized electronic programming guide (EPG) views, favorite television programming or other content, and/or other personalized information (e.g., according to login or other credentials).

As described briefly above, a pairing method of an embodiment utilizes a displayed visual code 110, such as a two-dimensional code encoded with STB pairing information, or other visual identifier displayed on a television display 108 or other display. The visual code 110 can be scanned and processed by a potential pairing companion, such as a user smartphone or tablet computer running STB pairing application code for example. Visual code scanner or reader applications are readily available and can be installed for use in conjunction with an integrated or otherwise coupled camera of a potential pairing companion. Some devices come prepackaged with such scanning and decoding applications.

The use of a visual code encoded with STB pairing information can facilitate device and/or user authentication in part by requiring a user to take action and process a displayed visual code with a camera of the personal device 102 before being able to use the personal device 102 in conjunction with the STB 104. The required physical proximity tends to ensure that the user is engaged with the content being provided via STB 104 and reduces inefficient use of available bandwidth. For example, the visual code 110 can be configured as a multi-dimensional visual code (e.g., two-dimensional QR code) encoded with STB pairing information, such as a unique identifier or other tracking information that is displayed by the STB 104 on the television display 106.

A subscriber or other user can use a personal device equipped with a camera and/or scanning application to scan and process the visual code 110 to establish a device-STB pairing relationship. In one embodiment, the visual code 110 can be further encoded with addressing instructions to enable the personal device 102 to automatically establish a pairing relationship with STB 104 without or absent, or in addition to, requiring services of server 108.

Each STB and/or companion device can be tracked using a unique identifier (ID) and/or other information in part to manage corresponding device-STB pairing relationships. The server 108 or other component can store the pairing information in part to manage aspects of each device-STB pairing relationship, including time to decouple or reestablish device-STB pairing relationships.

According to an embodiment, the personal device 102 can send decoded information processed from the visual code 110 to the server 108 to initiate or reestablish a device-STB pairing relationship. In one embodiment, the personal device 102 sends pairing information that includes a unique STB ID obtained from scanning and processing the visual code 110 along with a device ID to the server 108 as part of establishing a device-STB pairing relationship. Alternatively, the personal device 102 can send a captured image of the visual code 110 to the server 108 for processing by scanner or reader software of the server 108.

Once the server 108 or other component verifies that the decoded information is correct/valid and/or the user is an authorized user, the server 108 or other component of an embodiment is configured to send one or more successful pairing messages including pairing information to the personal device 102 and/or STB 104. The server 108 of one embodiment is configured to send a successful pairing message to the personal device 102 with instructions on how to communicate with the STB 104. For example, the server 108 can send a successful pairing message to the personal device 102 that includes STB addressing information, such as a network address of the STB within the user's home or other network. The successful pairing message can include other information such as a maximum amount of allowed pairing time, an amount of time before requiring a re-pairing operation, etc.

According to described embodiments, the STB 104 can be effectively bridged with a local or other network while paired with personal device 102. Once successfully paired, the personal device 102 can use the pairing information to directly and/or indirectly interact with the STB 104, including controlling the display of personalized EPG view content, STB navigation operations, and/or other STB control functions. In one embodiment, in addition to receiving the processed/scanned visual code, the server 108 can also be configured to process commands from the personal device 102, including voice commands, tap and swipe commands, etc., in part to provide the commands to the STB 104 as part of navigating personalized television programming and controlling the STB 104.

As an example, after logging in to a service network, a user can open a mobile STB pairing and control application using the personal device 102 and communicatively pair the personal device 102 with the STB 104 to establish a device-to-STB pairing relationship using the displayed visual code 110. As described above, the visual code 110 can be scanned using an associated camera, whether integral to the personal device 102 or coupled thereto, and decoded to obtain pairing information associated with the STB 104. For example, once logged into a mobile application or interface and connected to services offered by a service provider, one or more available STB companions can be displayed on the device display, television, or other display, wherein based on physical STB proximity, can select the corresponding STB (e.g., by tapping, voice command, etc.) to initiate the pairing method that includes display of the visual code to initiate establishment of a device-to-STB pairing relationship.

According to a particular implementation, additional instruction information can be displayed on the device display or television for example, such as instructions that inform a user to scan the visual code with a camera of a companion personal device to establish a pairing relationship. As described above, the server 108 can include additional information with each successful pairing message, such as communication instructions on how to establish a communication channel or coupling with the STB 104.

After receiving a successful pairing message, in addition to using the personal device 102 to control functions of the STB 104, the user can further personalize the services, such as assigning a name e.g. "Downstairs TV" to associate the STB 104 within the personal device 102. Additionally, user profile information can be used by the server 108 or some other component and sent to the STB 104 after pairing for display on one or more of the personal device 102 display, television, or other display. For example, after establishing the pairing relationship, a user's name, a greeting, a list of favorite channels, a number of recommended programs currently being shown, and/or messages retrieved from a third party Internet service (e.g., social media, RSS, etc.) can be displayed via STB 104.

The personal device 102 and/or STB 104 of an embodiment each include pairing application software comprising executable program instructions that can be used to establish a device-STB pairing relationship directly (e.g., peer to peer), or via server 108 or some other component. In one embodiment, pairing application software can be included as part of a mobile television or video streaming application, downloaded and installed, or accessed as part of web-based application. The pairing application software of an embodiment is configured in part to operate in conjunction with code scanning application software to establish a pairing relationship.

As will be understood, STB 104 is configured to couple to and/or decode different types of external signal sources, including wired and wireless signal sources, as part of displaying content such as television programming and other information on a television or other display. The STB 104 can directly and/or indirectly receive commands transmitted from the personal device 102 after successfully pairing the personal device 102 with the STB 104. Once successfully paired, the STB 104 operates in response to user input commands along with backend content delivery components as part of displaying personalized EPG views, video content, etc.

Pairing information, including prior and/or current pairing information, can be used to track and manage pairing relationships. For example, prior pairing information, such as a stored device ID and STB ID, can be used to automatically pair or re-pair a corresponding device and STB without requiring a user to re-scan a visual code. Depending on the implementation or service type, a user may be required to scan and submit the visual code each time a pairing relationship is desired or required.

According to an embodiment, once a device to STB pairing relationship is established, and as part communicating with STB 104, personal device 102 transmits a signal or message that includes a unique device ID identifying the personal device 102 along with a command or other instruction. The STB 104 of an embodiment can be configured to filter on a device ID parameter to process and filter relevant commands. Server 108 can use stored pairing information to manage pairing relationships including managing automatic pairing and decoupling operations. For example, the server 108 can store pairing relationships including STB to device pair mappings and/or designated times to decouple or require establishment of a new device-STB pairing relationship. Again, while a simplified diagram is shown in FIG. 1, it will be appreciated that a complex network includes a number of associated network-enabled components, including hardware and software components such as a plurality of networked servers, routers, switches, modems, and/or other client devices/systems.

Figure 2:
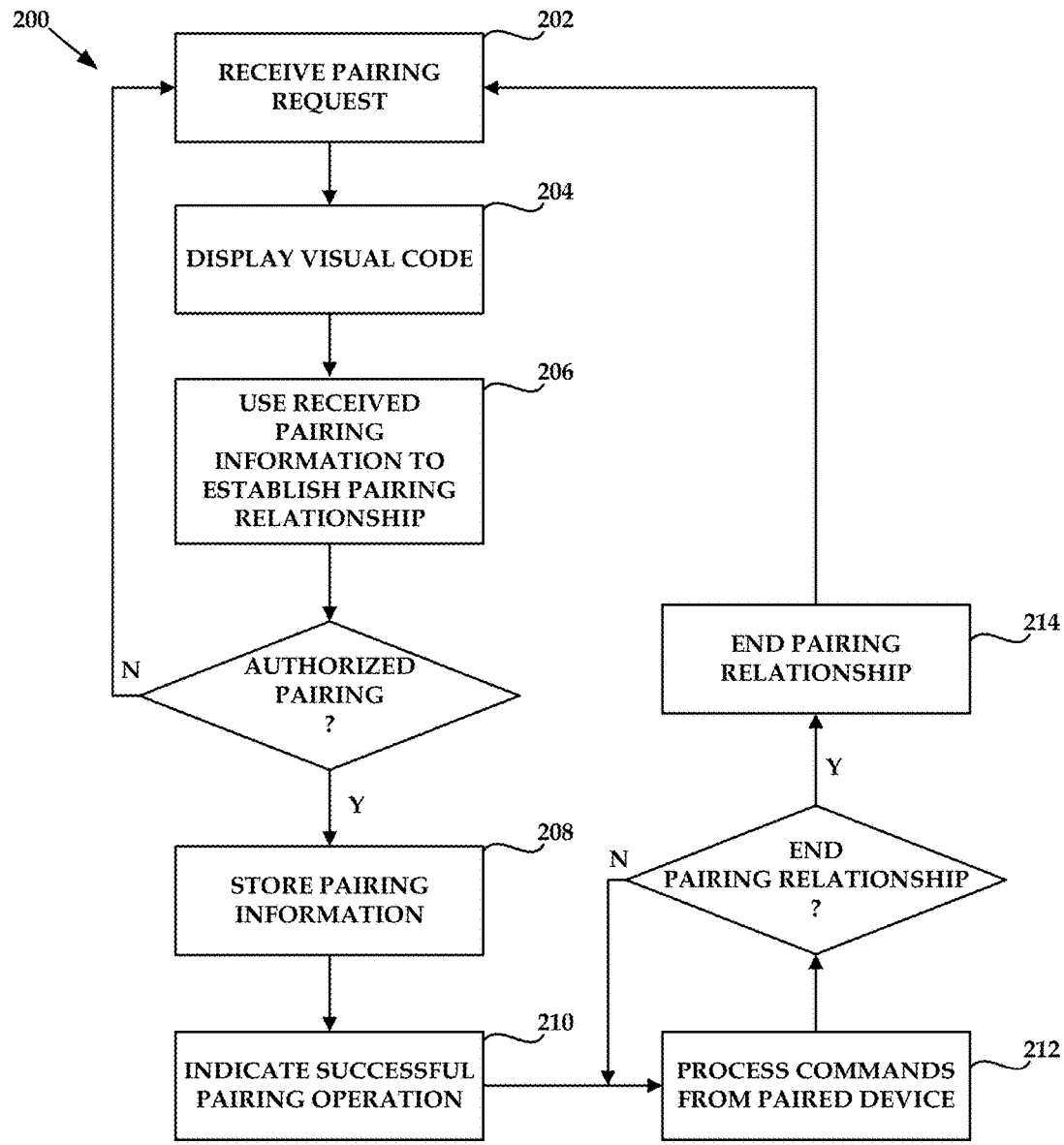
FIG. 2 is a flow diagram illustrating an exemplary process of establishing a communicative pairing relationship between a STB and a companion personal computing device according to an embodiment.

FIG. 2 is a flow diagram illustrating an exemplary process 200 of establishing a communicative pairing relationship between a STB and a companion device based in part on the use of a visual code or visual pairing code according to an embodiment. For example, a STB device can be equipped with application software to display a visual code on a television display which can be scanned by a companion device to establish a pairing relationship to thereby allow the companion device to send commands to the STB over a communication channel, such as over a wireless network, such as a LAN or other network type for example. The process 200 of an embodiment uses a client-server computer architecture, wherein after scanning the visual code, the companion device transmits decoded information to a server or other component to obtain addressing or other information that can be used to establish a pairing relationship.

Depending in part on a particular network configuration and/or subscription type, the process 200 can be configured to enable users to pair a personal device with a STB to enable use of a paired device to access personalized television programming and/or other network services. A server or other component can be configured to automatically establish pairing relationships and/or automatically decouple or disconnect pairing relationships. The process 200 can be used as part of controlling the use of subscribed to or other services along with ensuring that the user is engaged based in part on a code scanning operation of a displayed visual code to establish a pairing relationship before delivering video and other services.

With continuing reference to FIG. 2, at 202, the process 200 begins when a pairing request is used to initiate the establishment of a pairing relationship between a user device and an eligible STB. For example, a user can use pairing application software of a mobile device to send a request to a server or directly to the eligible STB to initiate the process 200 at 202. Alternatively, and as another example, after powering on the eligible STB and connecting to a service, a home screen or other screen can be configured to display pairing instructions to a user.

At 204, the process 200 operates to display a visual code for scanning by the user device before establishing the communicative coupling between the user device and eligible STB. For example, after receiving the pairing request, pairing application software of an eligible STB operates to display a two or more dimensional visual code on a connected television screen for scanning by scanning or reader application software using a camera of the user device. In one embodiment, a server can be configured to send a unique visual code to an eligible STB each time a pairing request is received.

At 206, the process 200 uses received pairing information from the user device as part of securely establishing the pairing relationship, wherein the pairing information of one embodiment includes a unique STB ID and/or other related STB information as decoded from the visual code, in addition to a unique device ID and/or other device information. For example, the process 200 at 206 can use a server to receive the pairing information sent from the user device to ensure that the pairing relationship is proper or authorized and secure (e.g., user is an authorized user, device is compatible, etc.).

If the user or device is not authorized to access the services or unable to establish a pairing relationship, the process 200 returns to 202. If the user or device is authorized and/or able to access the services, the process 200 at 208 operates to store the pairing information for the corresponding pairing relationship. The pairing information can include additional details regarding the pairing relationship, such as a time to disconnect a pairing relationship, a time to update a pairing relationship, etc. For example, the process 200 at 208 can use a server to securely store the pairing information or parameters that includes a STB unique ID and a device unique ID along with a pairing status as shown in the example of Table 1 below.

TABLE 1

| STB unique ID | Device unique ID | Paired |
|---|---|---|
| 001122334455 | 998877665544 | Yes |

At 210, the process 200 operates to indicate that a successful pairing operation and/or a device-STB pairing relationship is established. In an embodiment, the process 200 at 210 is configured to use a server to send a successful pairing message to each of the user device and/or paired STB. For example, the server can send a successful pairing message to the STB for displaying on a television screen and another successful pairing message to a user tablet computer to display on the tablet screen. According to an embodiment, the process 200 at 210 can include addressing instructions sent with the successful pairing message to the user device which enables the device to establish a communicative coupling with an eligible STB.

At 212, the process 200 operates to process commands sent from the user device and/or alter the user experience using profile information associated with the device user or other user. For example, the process 200 at 212 can operate to send commands from the user device directly to the paired STB and/or provide personalized EPG guide views via the paired STB, such as favorite channels, login identification information (username), etc. based on the user and/or unique device ID.

At 214, the process 200 operates to end or require renewal of the pairing relationship. For example, the process 200 at 214 can operate to decouple, terminate, or otherwise disassociate a pairing relationship, including storing the updated decoupled pairing status in computer storage. For example, pairing information can include a time to end each pairing relationship based on an allowed amount of pairing time or by way of a user command that results in disconnecting the pairing relationship (e.g., closes the pairing or mobile TV application, powers down a mobile device or STB, etc.).

A pairing operation may be required to be renewed in part to ensure physical proximity to an eligible STB and associated display. If the pairing relationship should not be disconnected or renewed, the process returns to 212. While a number and order of operations are described, it will be appreciated that the embodiments encompass other implementations.

As described above, the process 200 can be used to pair a user's personal device with an associated STB. It is also possible to pair multiple personal devices with a single STB such as first and second portable user devices. In such a plural device configuration, users may be required to select which user profile to use during any particular pairing time. Additionally, the process 200 of one embodiment can be configured to enable a peer to peer communication link to establish a pairing relationship. In such an embodiment, the eligible STB may be required to have wireless hardware to enable a peer to peer communication channel.

As one implementation example, the process 200 can be used as part of personal device pairing operation within a home cable television networking environment that includes several STBs. For this example, once the personal device has read and communicated the decoded information contained in the visual code associated with one of the STBs, a dedicated server can send a successful pairing message to the personal device that includes IP addressing instructions needed to address all of the STBs within the home. For example, a successful pairing message can include a broadcast IP address received by all STBs or a multicast group containing all STBs. Subsequent commands sent by the personal device include the personal device's unique ID. Upon receipt of a command sent by a personal device, the STB can periodically check with a dedicated server or other component to determine if the personal device is paired using the pairing relationship information maintained by the dedicated server.

As another implementation example, the process 200 can be used as part of pairing a personal device with a STB within a hotel or similar networked environment. In such an implementation, a temporary pairing method can be used that requires a previously paired personal device to reestablish the pairing relationship once some defined time or threshold is reached. Since the pairing is enabled on a temporary basis, the server can operate to disconnect the pairing at a configurable time, such as at check out or some other defined time. After the defined time has elapsed, the server can block messages or commands sent to the STB from personal device and send a message that it is time to pair again upon receiving subsequent commands or messages from the personal device.

Figure 3:
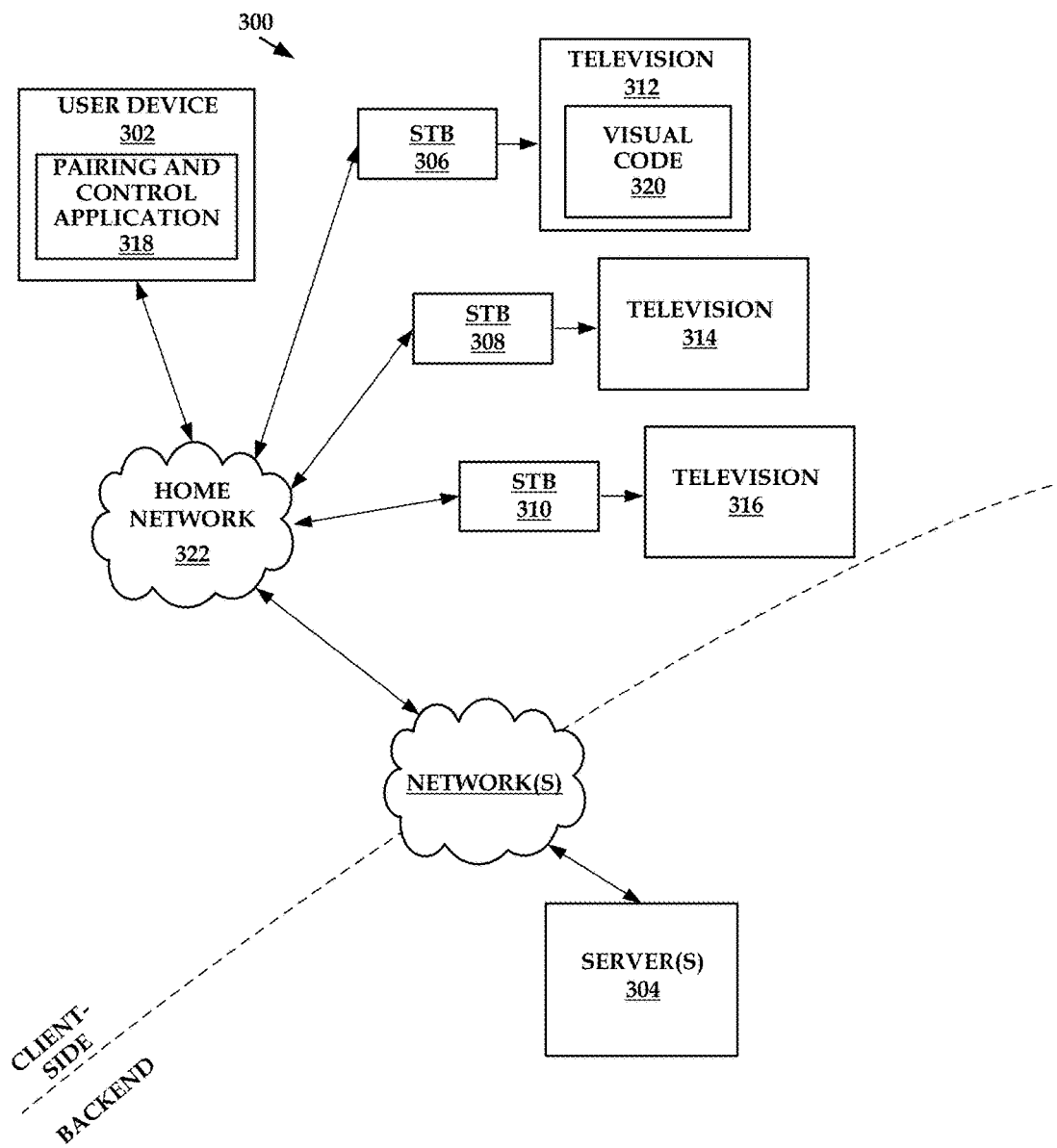
FIG. 3 is a functional block diagram that depicts components of an exemplary system used as part of a pairing implementation when a user has access to multiple STBs according to an embodiment.

FIG. 3 is a functional block diagram that depicts components of an exemplary system 300 used as part of a pairing implementation when a user has access to multiple STBs according to an embodiment. As shown in FIG. 3, the system 300 includes a user device 302, a server 304, a first STB 306, a second STB 308, and a third STB 310. The first STB 306 is coupled to television 312, the second STB 308 is coupled to television 314, and the third STB is coupled to television 316.

The device 302 includes a STB pairing and control application 318 configured with programming code to decode information from a visual code displayed on a display in part to establish STB pairing relationships. For this example, as part of initiating a pairing relationship, assume that the user is in physical proximity to STB 306 and television 312, such that a camera of device 302 can be used to scan and process visual code 320 displayed on television 312. The pairing and control application 318 can also be configured with automatic discovery and pairing features that operate to automatically identify one or more available STBs for automatic pairing. It will be appreciated that peer to peer implementations may include different or more limited controls as compared with a client-server configuration.

Once the pairing relationship is initiated, information associated with the scanned and processed visual code 320 is communicated from device 302 via home network 322 to the server 304 as part of establishing a pairing relationship and bridging the STBs with the home network 322. Once the server 304 has received the correct information as decoded by device 302, the server 304 can provide a multicast IP address (e.g., "239.1.1.1" that contains all STB associated with home network 322) to the device 302 that enables the device 302 to simultaneously transmit commands including a unique device ID or other information to all three STBs. Once obtaining the multicast IP address, communications from device 302 can bypass server 304 and individual STBs can use filtering code to filter on a paired device ID to accept command inputs and take any appropriate actions.

As an illustrative example, the pairing information listed in Table 2 below can be used as part of managing STB to device pairing relationships, including a pairing relationship between device 302 and STB 306, such that STB 306 responds to commands issued from device 302 but not from other devices. In an embodiment, server 304 is configured to automatically provide the device ID associated with device 302 to the appropriate STB, so that STB 306 can filter on device ID=998877665544. In another embodiment, upon receiving a multicast message, STB 306 can query server 304 to obtain companion pairing information which, for this example, is device ID 998877665544 along with a pairing status of "Yes" which enables STB 306 to respond and not ignore commands issued from device 302.

As shown in Table 2, for this example, STB 308 is paired with a device having a device ID of AC8877665533 and STB 310 is not currently paired with a user device. The pairing information can be maintained by server 304 according to this example for each device and each STB associated with system 300. According to this example, based on user input, device 302 can transmit a message with command along with a device ID of 998877665544 as a multicast transmission.

A matching or paired STB, STB 306 for this example, takes an appropriate action based on the command issued from device 302. For this example, STB 308 and STB 310 will ignore the command issued from device 302 since STB 308 is filtering on device ID=AC8877665533 and STB 310 is not currently paired and thus not filtering for a device ID. It will be appreciated that the pairing information maintained by server 304 can include additional information to manage and control pairing relationships.

TABLE 2

| STB unique ID | Paired device unique ID | Paired |
|---|---|---|
| 001122334455 | 998877665544 | Yes |
| 001122334466 | AC8877665533 | Yes |
| 001122334477 | None | No |

Pairing relationships can be uncoupled or un-paired according to various implementation preferences. For example, an un-pairing request can be sent from either device 302 or STB 306 to server 304 to undo or uncouple an associated pairing relationship. The server 304 can also be configured to automatically un-pair certain devices and STBs based on an amount of time or some other uncoupling parameter. Powering off or otherwise stopping communications can also be used to trigger an un-pairing operation. Once unpaired, parameters of Table 2 can be updated to reflect the new status.

Figure 4:
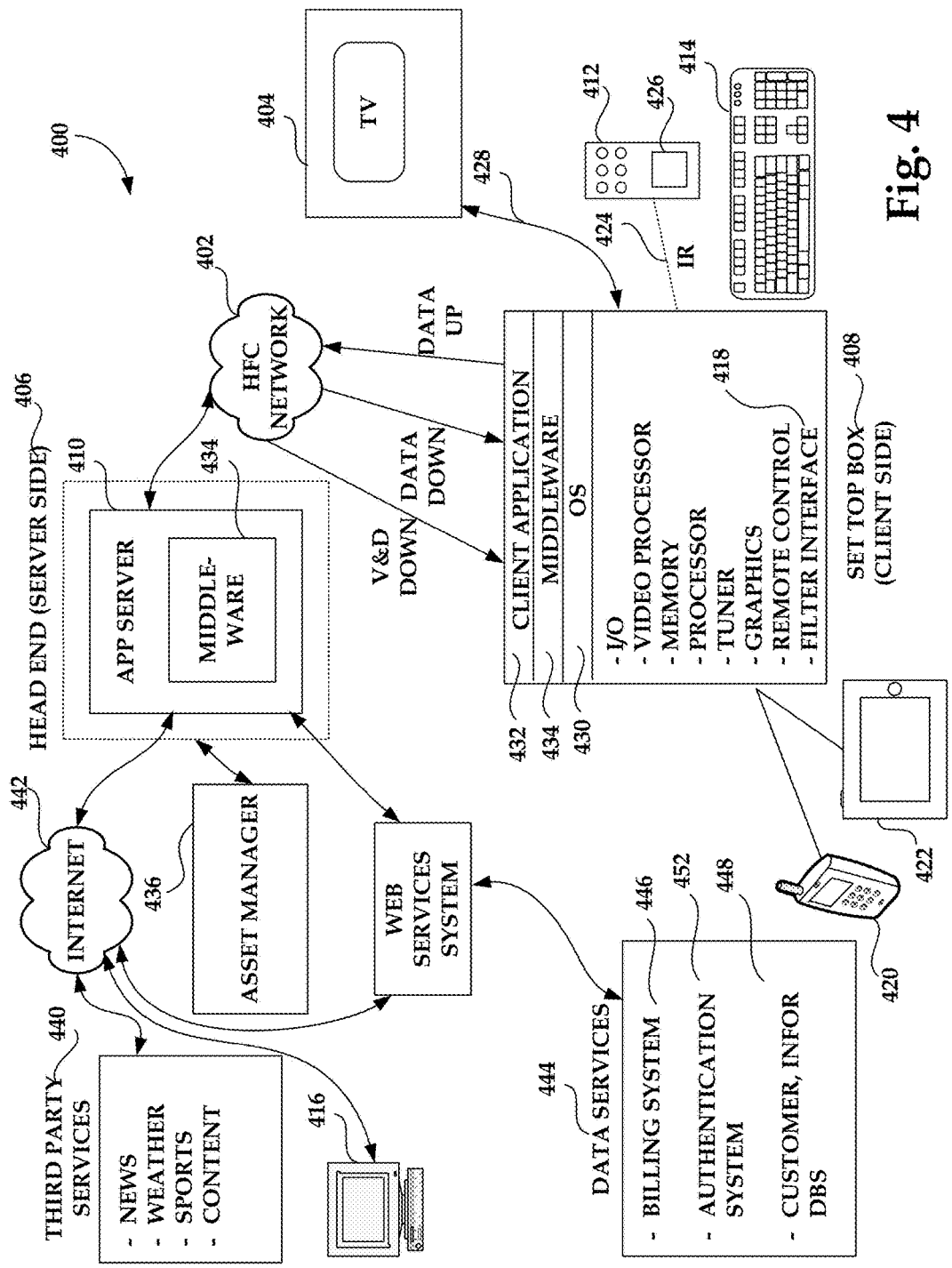
FIG. 4 depicts components of an exemplary communication architecture providing an operating environment according to an embodiment.

FIG. 4 depicts components of an exemplary communication architecture 400 providing an operating environment according to an embodiment. The architecture 400 includes components that provide cable television and other services (hereafter referred to as "CATV"). Components of the architecture 400 can be configured to enable users to use a pairing application to communicatively pair user devices with corresponding STBs, such as STBs associated with a home, a business, or other setting. For example, a user can use a camera-equipped mobile device to scan a visual code provided by a companion STB to establish a pairing relationship such that the user can use the mobile device to interact with the companion STB.

As shown in FIG. 4, digital and analog video programming, information content, and interactive television services are provided via a hybrid fiber coax (HFC) network 402 including optical fiber and coaxial cable components to a television 404, such as a smart television for example. Typically, optical fiber runs from the cable head end 406 to neighborhoods of subscribers. Coaxial cable runs from the optical fiber feeders to each customer or subscriber. The functionality of the HFC network 402 allows for efficient bidirectional data flow between client-side components, such as STB 408, and application server 410.

The exemplary architecture 400 can be configured as a distributed client-server computing architecture for providing video and data flow across the HFC network 402 from server-side services providers (e.g., cable television/services providers) via head end 406 and STB 408 or other component functionally connected to a customer receiving device, such as a smart television set 404 or other device/system for example. Modern CATV systems provide a variety of services across the HFC network 402 including digital and analog video programming, telephone services, high speed Internet access, video-on-demand, live video streaming, and/or information services as known to those skilled in the art.

On the client side of the architecture 400, digital and analog video programming and digital and analog data are provided to the customer via the STB 408 and/or some other signal processing component. The STB 408 of an embodiment can be configured to be IP-enabled and/or otherwise configured to deliver IP television services to provide live video streaming capability for users to stream video to multiple user devices/systems.

Interactive television services that allow a customer to input data to the architecture 400 likewise are provided by the STB 408. As shown in FIG. 4, the STB 408 of an embodiment is configured as a multipurpose computing device having at least one computer processor, memory, and/or input/output mechanism(s) and functionalities. An input/output mechanism receives input from server-side processes via the HFC network 402 and from customers via input devices such as the remote control device 412, keyboard 414, or other computing device/system 416, such as a tablet/slate computer, smart phone, etc.

The STB 408 of an embodiment can also include IP communication capability and provide a filter interface 418 for presenting filtered programming and/or content via STB 408 to the TV 404. While the filter interface 418 may be implemented using a STB, the filter interface 418 may also be provided using a wireless device 420, any type of network media device, or any device capable of interfacing with a STB 408 or in a server or other module on the head end side. Compatible devices may include DVRs, wireless phones, PCs, laptop computers, tablet/slate computers, media viewing devices, and the like.

The remote control device 422 and the keyboard 414 may communicate with the STB 408 via a suitable communication transport such as the infrared connection 424. The remote control device 422 may include a biometric input module 426. The STB 408 also includes a video processor for processing and providing digital and analog video signaling to the television set 404 via a cable communication transport 428. A multi-channel tuner is provided for processing video and data to and from the STB 408 and the server-side head end system 406.

The STB 408 also includes an operating system 430 for directing the functions of the STB 408 in conjunction with a variety of client applications 432. Because a variety of different operating systems 430 may be utilized by a variety of different brands and types of set-top boxes, a middleware layer 434 may be provided to allow a given software application to be executed by a variety of different operating systems. According to an embodiment, the middleware layer 434 may include a set of application programming interfaces (APIs) that are exposed to client applications 432 and operating systems 430 that allow the client applications to communicate with the operating systems through common data calls understood via the API set.

A corresponding middleware layer can be included on the server side of the architecture 400 for facilitating communication between the application server and the STB 408. The middleware layer 434 of the application server and middleware layer of the STB 408 may format data passed between the client side and server side according to a markup language such as Extensible Markup Language (XML) for example.

According to one embodiment, the STB 408 passes digital and analog video and data signaling to the television 404 via a one-way communication transport. According to other embodiments, two-way communication transports may be utilized, for example, via high definition multimedia (HDMI) ports. The STB 408 may receive video and data from the server side of the architecture 400 via the HFC network 402 through a video/data downlink and data via a data downlink.

The STB 408 may transmit data from the client side to the server side via the HFC network 402 via one data uplink. The video/data downlink is an in band downlink that allows for digital and analog video and data signaling from the server side of the architecture 400 using the HFC network 402 to the STB 408 for use by the STB 408 and for distribution to the television set 404. An in band signaling space operates at a relative high frequency, e.g., between 54 and 1000 megahertz and an exemplary signaling space is generally divided into 6 megahertz channels in which may be transmitted as a single analog signal or a greater number of digital signals.

The data downlink and the data uplink between the HFC network 402 and the STB 408 may comprise out of band data links. An out of band frequency range is generally at as a lower frequency than in band signaling. For example, the out of band frequency range may be between zero and 54 megahertz. Data flow between the STB 408 and the application server 410 can be passed through out of band data links. Alternatively, an in band data carousel may be positioned in an in band channel into which a data feed may be processed from the application server 410 through the HFC network 402 to the STB 408. Operation of data transport between components of the architecture 400 is well known to those skilled in the art.

With continuing reference to FIG. 4, the head end 406 is positioned on the server side and includes hardware and software systems responsible for originating and managing content for distributing through the HFC network 402 to the client-side for presentation to customers via television 404 or some other client device/system. As described above, a number of services may be provided by the architecture 400, including digital and analog video programming, interactive television services, telephone services, video-on-demand services, targeted advertising, and provision of information content. An asset manager 436 maintains content at the head end 406. The asset manager 436 may also include a decision server for processing rules and other input to determine what content to provide.

The application server 410 can be configured as a computing system operative to assemble and manage data sent to and received from the STB 408 via the HFC network 402. As described above with reference to the STB 408, the application server 410 includes a middleware layer 434 for processing and preparing data from the head end for receipt and use by the STB 408. For example, the application server 410 via the middleware layer 434 may obtain data from third-party services 440 via the Internet 442 for example and transmit to a customer through the HFC network 402 and the STB 408. For example, a weather report from a third-party weather service may be downloaded by the application server via the Internet 442. When the application server 410 receives the downloaded weather report, the middleware layer 434 may be utilized to format the weather report for receipt and use by the STB 408.

According to one embodiment, data obtained and managed by the middleware layer 434 of the application server 410 is formatted using XML and passed to the STB 408 where the XML-formatted data may be utilized by a client application 432 in concert with the middleware layer 434. As should be appreciated by those skilled in the art, a variety of third-party services data, including news data, weather data, sports data and other information content may be obtained by the application server 410 via distributed computing environments such as the Internet 442 for provision to customers via the HFC network 402 and the STB 408.

According to various embodiments, the application server 410 obtains customer support services data, including billing data, information on customer work order status, answers to frequently asked questions, services provider contact information, and the like from data services 444 for provision to the customer via an interactive television or other session. The services provider data services 444 include a number of services operated by the services provider of the architecture 400 which may include data on a given customer.

A billing system 446 may include information such as a customer's name, street address, business identification number, Social Security number, credit history, and information regarding services and products subscribed to by the customer. According to embodiments, the billing system 446 may also include billing data for services and products subscribed to by the customer for bill processing, billing presentment and payment receipt.

A customer information database 448 may include general information about customers such as place of employment, business address, business telephone number, and demographic information such as age, gender, educational level, and the like. The customer information database 448 may also include information on pending work orders for services or products ordered by the customer. The customer information database 448 may also include general customer information such as answers to frequently asked customer questions and contact information for various service provider offices/departments. As should be understood, information may be stored in a variety of disparate databases operated by the cable services provider.

As shown in the example of FIG. 4, a web services system 450 is illustrated between the application server 410 and the data services 444. According to embodiments, web services system 450 serves as a collection point for data requested from each of the disparate data services systems comprising the data services 444. According to various embodiments, when the application server 410 requires customer services data from one or more of the data services 444, the application server 410 passes a data query to the web services system 450. The web services system 450 formulates a data query to each of the available data services systems for obtaining any required data for a requesting customer as identified by a set-top box or other identification associated with a customer.

The web services system 450 serves as an abstraction layer between the various data services systems and the application server 410. That is, the application server 410 of an embodiment is not required to communicate with the disparate data services systems, nor is the application server 410 required to understand the data structures or data types utilized by the disparate data services systems.

The web services system 450 is operative to communicate with each of the disparate data services systems for obtaining necessary customer data. The customer data obtained by the web services system is assembled and is returned to the application server 410 for ultimate processing via the middleware layer 434, as described above. An authentication system 452 may include securely stored information according to known encryption and storage techniques, such as secure user names, subscriber profiles, subscriber IDs, passwords, and/or other information for accessing network services. As will be understood by those skilled in the art, the disparate systems may be integrated or provided in any combination of separate systems, wherein FIG. 4 only serves as one example.

Figure 5:
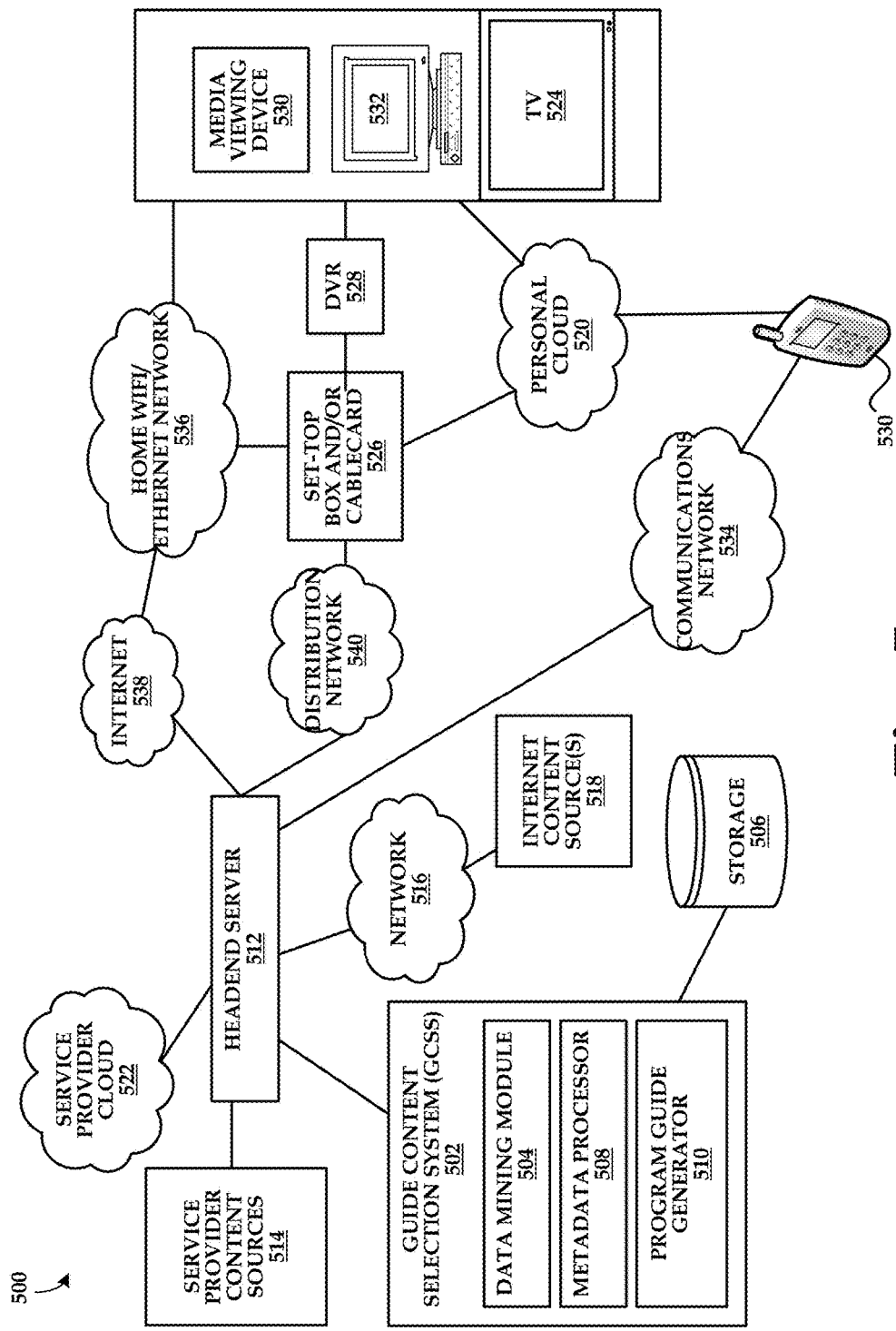
FIG. 5 depicts components of an exemplary communication architecture providing an operating environment according to an embodiment.

FIG. 5 depicts components of an exemplary communication architecture 500 providing an operating environment according to an embodiment. Components of the architecture 500 are configured in part to provide information associated with content from a plurality of sources which can be delivered to paired STB and/or device after establishing a successful pairing relationship, according to an embodiment. A guide content selection system (GCSS) 502 is illustrative of one or more computing components to which metadata and other information for linear and non-linear programs may be provided for analyzing, categorizing, processing, storing, and/or linking with other available data for providing subscriber services.

According to embodiments, each of the components of the GCSS 502 illustrated in FIG. 5 may operate as stand-alone components that are operatively coupled with a data hub for providing and receiving data in association with programming content and availability, business rules, profiles, devices, etc. Accordingly, a data mining module 504, storage 506, metadata processor 508, and a program guide generator 510 may be independent operating entities located at disparate locations and that are operative for generating program guide data and/or operate as a collection or distribution of components at one or more locations in communication via a distributed computing network, such as the Internet or an intranet. In certain embodiments, features of the data mining module 504, storage 506, metadata processor 508, and/or the program guide generator 510 may be integrated or operate in a variety of combinations of components.

As shown in FIG. 5, the headend server 512 may provide different metadata for non-linear programs/content. The guide content selection system (GCSS) 502 may receive metadata for non-linear programs/content from the headend server 512 as well as metadata from other service provider content sources 514, such as Video On Demand (VOD) and video content available through a network 516 from Internet content sources 518.

Additionally, the GCSS 502 may receive customer's purchased content, content available from the customer's cloud 520, and/or content from the service provider's cloud 522. Content metadata may be categorized based on availability and sent to customer devices/systems for maintaining or using the program guide data. The customer devices/systems may include a smart television 524, STB, and/or cablecard 526, a DVR 528, a smart phone 530, and/or user media devices 530 and 532. Smart phone 530 may receive data via a communications network 534 or by access the customer's personal cloud 520, as known in the art.

The data mining module 504 can be configured to access content sources and retrieve data associated with content for viewing. The data mining module 504 can analyze the data from different perspectives or sources and/or summarize mined data into useful information. The data mining module 504 may categorize the content, for example, based on the day/time/customer preferences, to display the user programming information. The metadata processor 508 can be configured to process linear video program guide data, store past program guide data, process other available data, determine a duration for maintaining the data and/or link other available data for use by the program guide generator 510 to provide display views on user devices/systems.

The customer site can include a home WiFi/Ethernet network 536 that provide access to the Internet 538, a set-top box and/or cablecard 526, DVR 528, and other user devices/systems. The home WiFi/Ethernet network 536 may receive data and transfer the data to the appropriate endpoint such as the smart television 524, set-top box and/or cablecard 526, DVR 528, and/or other user devices/systems. Likewise, the home WiFi/Ethernet network 536 may receive data from any device/system on the customer site and transmit the data to other components. The set-top box and/or cablecard 526 can receive content using the headend server 512 via the distribution network 540 and provide the content to the user devices/systems for display. Digital rights management may dictate that certain content is available for viewing only on a particular device.

As discussed above, the exemplary architecture 500 includes infrastructure for delivering and receiving content using server-side components and consumer-side or client-side components. The architecture 500 can be configured to deliver high-speed broadband data signals and services to end-users. The architecture 500 includes an IP backbone comprising a packet-switched network, such used for the Internet, wireless communication, ADSL and CATV. The IP backbone can be used to distribute a rich array of digital content, including video streaming, to a variety of client applications.

The architecture 500 enables broad access to content of a content delivery network (CDN) including content accessible by users via the Internet or some other network. IP-enabled set-top boxes can be controlled by a middleware platform to provide linear IP video MPEG by encapsulating packets for transmitting and receiving. Video signals can be delivered using a cable modem termination system (CMTS), QAM components, and/or some other component or protocol. CDNs typically function by receiving requests from clients, checking a local cache for a copy of the requested resource, or querying some source if a requested resource is not in the cache or has expired for example. CDN servers can be strategically located at the edges of various networks to limit loads on network interconnects and backbones. CDN servers can be redundantly deployed and interact with other CDN servers to respond to content requests from clients in attempts to optimize content delivery. For example, network edge servers can enable ease of browsing, navigating and streaming of content, including streaming live video.

Components can be operatively coupled with a data hub for providing and receiving data in association with programming content and availability, business rules, profiles, devices/systems, etc. Collecting content can include non-linear programs/content, other service provider content (Video On Demand (VOD)), content available through a network that includes a plurality of Internet content sources, etc. Content may be associated with a customer's purchased content, a personal or customer cloud, content from other service provider clouds, and/or from a QAM tuner. Content metadata may be categorized based on the availability and sent to customer devices/systems for maintaining or using the program guide data. Depending on the particular customer set-up, a customer may employ different networked components, including a WiFi/Ethernet network to receive video over IP, including but not limited to, a modem, set-top box/cablecard, game console, DVR, smart phone, desktop, laptop, etc.

A typical implementation example may include a subscriber using a tablet, slate phone, smart television and the like to view video programming or other content using a high speed Internet service, a video streaming application, and a DOCSIS modem, eMTA, or gateway. A WiFi/Ethernet network can receive data and transfer data to an appropriate consumer device/system via an IP-enabled STB, and also receive/transmit data from any device/system to other components of the architecture 500. It will be appreciated that there are different types of communication networks and associated components that can be used to deliver video and other content to consumer devices, including smart televisions, tablet computers, laptop computers, desktop computers, etc.

The embodiments and functionalities described herein may operate via a multitude of computer implementations, including wired and wireless computing systems, mobile computing systems (e.g., mobile telephones, tablet or slate type computers, laptop computers, etc.). In addition, the embodiments and functionalities described herein may operate over distributed systems, where application functionality, computer storage including memory, data storage and retrieval and various processing functions may be operated remotely from each other over a distributed computing network, such as the Internet or an intranet. The example devices and systems discussed herein are for purposes of example and illustration and are not limiting of a vast number of configurations that may be utilized for practicing various embodiments.

Figure 6:
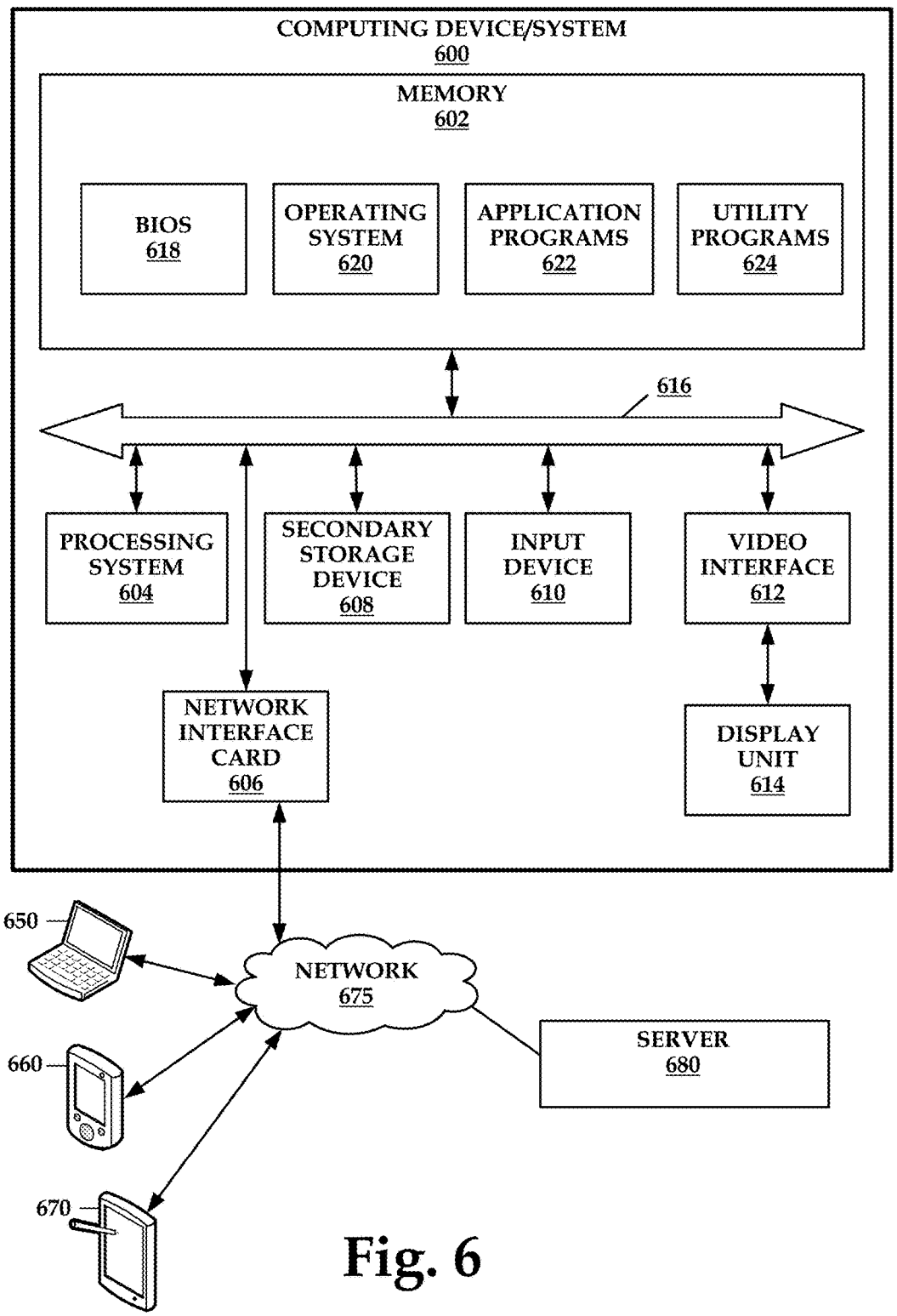
FIG. 6 is a block diagram illustrating exemplary components which embodiments may be practiced.

FIG. 6 is a block diagram illustrating exemplary components with which embodiments may be practiced. It should be appreciated that other embodiments may be implemented using computing devices having hardware and/or software components other than those illustrated in the example of FIG. 6. Computing devices/systems may be implemented in different ways in different embodiments.

For the example of FIG. 6, the computing device 600 includes a processing system 604, computer storage or memory 602, a network interface 606, a secondary storage device 608, an input device 610, a video interface 612, a display unit 614, and a communication medium 616. In other embodiments, the computing device 600 may be implemented using more or fewer hardware components (e.g., a video interface, a display unit, input device(s), etc.) or in combination with other types of computer systems and program modules.

The memory 602 includes one or more computer-readable storage, computer storage, or computer-readable storage media capable of storing data and/or computer-executable or encoded instructions. Memory 602 thus may store the computer-executable instructions that, when executed by processor 604, cause the application server 104 to allow broad access to content placed on a content delivery network (CDN).

In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media or medium encompasses computer storage including volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more core microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface 606. In different embodiments, the network interface 606 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600. The video interface 612 outputs video information to the display unit 614. In different embodiments, the video interface 612 is implemented in different ways. For example, the video interface 612 is a video expansion card. In another example, the video interface 612 is integrated into a motherboard of the computing device 600.

In various embodiments, the display unit 614 can be a an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The memory 602 also stores one or more utility programs 624 that, when executed by the processing system 604, cause the computing device 600 to provide utilities to other software programs.

Embodiments of the present invention may be utilized in various distributed computing environments where tasks are performed by remote processing devices that are linked through a communications network in a distributed computing environment. Moreover, embodiments may be implemented such that each or many of the components illustrated in FIG. 6 may be integrated onto a single integrated circuit. When operating via such a single integrated circuit, the functionality, described herein, may be operated via application-specific logic integrated with other components of the computing device/system 600 on the single integrated circuit.

A server 680 may provide other services to client devices/systems. As one example, server 680 may be a web server providing web services over the web network 675. Example clients include computing device 650, which may include any general purpose personal computer (such as computing device 600), a tablet computing device 670 and/or mobile computing device 660, such as smart phones.

Figures 7A, 7B:
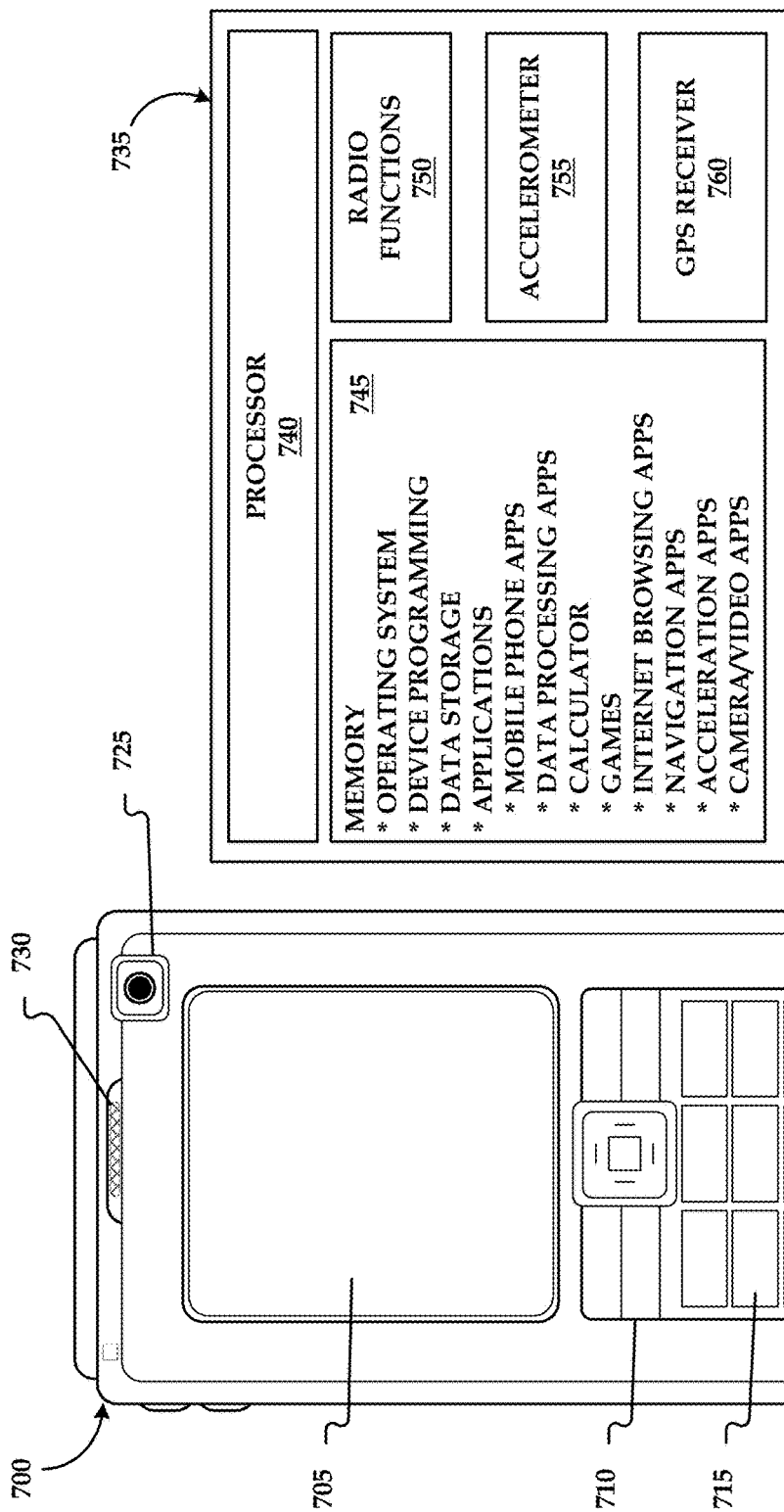
FIGS. 7*a*-7*b* illustrate an exemplary mobile computing environment in which which embodiments may be practiced.

FIGS. 7a-7b illustrate an exemplary mobile computing environment comprising a mobile computing device 700 such as a smart phone, a tablet or slate computer, a laptop computer, and the like, with which embodiments may be practiced. The mobile computing device 700 is illustrative of any suitable device operative to send, receive and process wireless communications according to embodiments of the present invention. A display screen 705 is operative for displaying a variety of information such as information about incoming and outgoing communications, as well as, a variety of data and displayable objects, for example, text, alphanumeric data, photographs, and the like.

Data input to the device 700 may be performed via a variety of suitable means, such as, touch screen input via the display screen 705, keyboard or keypad input via a data entry area 710, key input via one or more selectable buttons or controls 715, voice input via a microphone 718 disposed on the device 700, photographic input via a camera 725 functionality associated with the mobile computing device, or any other suitable input means. Data may be output via the device 700 via any suitable output means, including but not limited to, display on the display screen 705, audible output via an associated speaker 730 or connected earphone system, vibration module for providing tactile output, and the like.

Referring now to FIG. 7b, operational unit 735 is illustrative of internal operating functionality of the mobile computing device 700. A processor 740 is illustrative of a general purpose computer processor for processing incoming and outgoing data and communications and controlling operation of the device and associated software applications via a mobile computing device operating system. Memory 745 may be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 700 may contain an accelerometer 755 for detecting acceleration, and can be used to sense orientation, vibration, and/or shock. Mobile computing device 700 may contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the device 700 to communicate with other communication devices and systems via a wireless network. Radio functions 750 may be utilized to communicate with a wireless or WIFI-based positioning system to determine a device location.

Although described herein in combination with mobile computing device 700, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

Although embodiments have been described as being associated with data stored in memory and other storage mediums, data may also be stored on or read from other types of computer storage or computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method including use of a server to establish a pairing relationship comprising:
   receiving a pairing request from a mobile device to establish a mobile device to set-top box (STB) pairing relationship;
   receiving, at the server, pairing information associated with processing of a visual code by the mobile device;
   receiving, at the server, a device identifier (ID) associated with the mobile device as part of establishing the mobile device to STB pairing relationship;
   determining if the mobile device to STB pairing relationship is authorized based in part on the pairing information associated with the visual code and the device ID associated with the mobile device;
   establishing the mobile device to STB pairing relationship to enable a communicative coupling between the mobile device and at least one STB if the pairing is authorized;
   after establishing the mobile device to STB pairing relationship to enable the communicative coupling between the mobile device and the at least one STB, providing an IP address of the least one STB to the mobile device to enable communications from the mobile device to bypass the server;
   using the at least one STB as part of filtering on the device ID of the mobile device to take an appropriate action based on a command issued from the mobile device;
   using the at least one STB as part of ignoring a command issued from a different mobile device having a different device ID; and
   requiring renewal of the mobile device to STB pairing relationship at a time after establishing the mobile device to STB pairing relationship, wherein renewal of the mobile device to STB pairing relationship requires receiving the pairing information after the visual code has been scanned by the mobile device to ensure visual proximity with the at least one STB.

2. The method of claim 1, wherein a server generates the visual code which comprises a two or more dimensional code displayed on a display, wherein the visual code is encoded with STB identification information for scanning by the mobile device.

3. The method of claim 1, further comprising using the mobile device to access the services and control the at least one STB after establishing the mobile device to STB pairing relationship.

4. The method of claim 1, further comprising displaying a personalized electronic program guide (EPG) view using a display of the mobile device after establishing the mobile device to STB pairing relationship.

5. The method of claim 1, further comprising using a server component to store a unique STB ID associated with the at least one STB and a mobile device unique ID along with a pairing status after establishing the mobile device to STB pairing relationships.

6. The method of claim 1, further comprising sending a successful pairing message to the mobile device and to the at least one STB after establishing the mobile device to STB pairing relationship.

7. The method of claim 6, wherein the successful pairing message sent to the mobile device includes addressing instructions used to communicate with the at least one STB.

8. The method of claim 1, further comprising using a server component to decouple the mobile device to STB pairing relationship.

9. The method of claim 1, further comprising sending a network address associated with the at least one STB to the mobile device before establishing the mobile device to STB pairing relationship.

10. The method of claim 1, further comprising using user profile information in part to populate aspects of a personalized EPG view after establishing the mobile device to STB pairing relationship.

11. A system comprising:
    a STB configured to:
       provide television programming and other services;
       filter on a device ID of a mobile device to take an appropriate action based on a command issued from the mobile device according to a mobile device to STB pairing relationship; and
       ignore a command issued from a different mobile device having a different device ID; and
    a server configured to:
       receive the device ID associated with the mobile device as part of establishing the mobile device to STB pairing relationship between the STB and the mobile device;
       process pairing information associated with the processing of a visual code as part of establishing the mobile device to STB pairing relationship;
       determine if the mobile device to STB pairing relationship is authorized based in part on the pairing information associated with the visual code and the device ID associated with the mobile device; and
       establish the mobile device to STB pairing relationship to enable a communicative coupling between the mobile device and the STB if the pairing is authorized, wherein the server is configured to require renewal of the mobile device to STB pairing relationship at a time after establishing the mobile device to STB pairing relationship, wherein renewal of the mobile device to STB pairing relationship requires receiving the pairing information after the visual code has been scanned by the mobile device to ensure visual proximity with the STB, wherein the server provides an IP address of the STB to the mobile device to enable communications from the mobile device to bypass the server after establishing the mobile device to STB pairing relationship to enable the communicative coupling between the mobile device and the STB.

12. The system of claim 11, wherein the STB is configured to download the visual code from the server, the visual code comprising a two or more dimensional code encoded with unique STB identification information.

13. The system of claim 11, further comprising a mobile device that includes a camera to process the visual code.

14. The system of claim 11, wherein the server is configured to use decoded information processed from the visual code to enable the mobile device to STB pairing relationship.

15. The system of claim 11, wherein the server is further configured to send a message that includes STB addressing information to establish the mobile device to STB pairing relationship.

16. The system of claim 11, wherein the server is further configured to use profile information in part to provide a personalized EPG view after establishing the mobile device to STB pairing relationship.

17. The system of claim 11, wherein the server is further configured to store pairing information that includes the device ID and a STB ID associated with the mobile device to STB pairing relationship.

18. Computer storage, excluding a signal, which stores instructions that, when executed, operate to:
  receive a pairing request to pair a portable computing device with a STB to create a device to STB pairing relationship;
  receive a unique ID associated with the portable computing device as part of establishing the device to STB pairing relationship;
  receive pairing information associated with processing of a visual code by the portable computing device, the pairing information including a unique ID associated with the STB and the unique ID associated with the portable computing device;
  communicatively pair the portable computing device with the STB upon determining that the device to STB pairing relationship is authorized based on the pairing information associated with the visual code and the unique ID associated with the portable computing device;
  provide an IP address of at least one STB to the portable computing device to enable communications from the portable computing device to bypass a server associated with the receiving of the pairing information;
  filter on the unique ID of the portable computing device to take an appropriate action based on a command issued from the portable computing device;
  ignore a command issued from a different portable computing device having a different unique ID; and
  require renewal of the device to STB pairing relationship at a time after establishing the device to STB pairing relationship, wherein renewal of the device to STB pairing relationship requires receiving the pairing information after the visual code has been processed by the portable computing device to ensure visual proximity with the STB.

19. The computer storage of claim 18, wherein the instructions, when executed, further operate to store pairing information including a paired device unique ID associated with a paired device and a STB ID associated with a paired STB.

20. The computer storage of claim 18 wherein the instructions, when executed, further operate to control a time of communicative pairing between a portable computing device and an associated STB after correctly processing a two or more dimensional visual code.

* * * * *